United States Patent
Johnson et al.

(10) Patent No.: US 10,053,923 B2
(45) Date of Patent: Aug. 21, 2018

(54) ENHANCED UNION CONNECTION

(71) Applicant: FORUM US, INC., Houston, TX (US)

(72) Inventors: Andrew J. Johnson, Corpus Christi, TX (US); Mark C. Dille, Houston, TX (US); Wesley D. Freed, Aledo, TX (US)

(73) Assignee: FORUM US, INC., Houston, TX (US)

( * ) Notice: Subject to any disclaimer, the term of this patent is extended or adjusted under 35 U.S.C. 154(b) by 315 days.

(21) Appl. No.: 15/142,027

(22) Filed: Apr. 29, 2016

(65) Prior Publication Data
US 2017/0314336 A1  Nov. 2, 2017

(51) Int. Cl.
| F16L 19/02 | (2006.01) |
| E21B 17/042 | (2006.01) |
| F16L 19/06 | (2006.01) |
| F16L 19/05 | (2006.01) |

(52) U.S. Cl.
CPC ........ *E21B 17/042* (2013.01); *F16L 19/0206* (2013.01); *F16L 19/0218* (2013.01); *F16L 19/0231* (2013.01); *F16L 19/05* (2013.01); *F16L 19/063* (2013.01)

(58) Field of Classification Search
CPC .................................................. F16L 19/0206
USPC ........................................ 285/388, 354, 387
See application file for complete search history.

(56) References Cited

U.S. PATENT DOCUMENTS

| 944,877 | A | * | 12/1909 | Koschinski | ......... | F16L 19/0206 |
| | | | | | | 285/388 |
| 1,016,620 | A | * | 2/1912 | Gapp | ................... | F16L 19/0206 |
| | | | | | | 285/388 |
| 1,586,276 | A | * | 5/1926 | Woodruff | .............. | F16L 37/127 |
| | | | | | | 285/388 |
| 2,967,068 | A | * | 1/1961 | Gressel | ............... | F16L 19/0206 |
| | | | | | | 285/388 |
| 3,113,792 | A | * | 12/1963 | Brown | ................ | F16L 19/0231 |
| | | | | | | 285/388 |
| 4,150,847 | A | * | 4/1979 | De Cenzo | ........... | F16L 19/0231 |
| | | | | | | 285/388 |
| 4,676,479 | A | * | 6/1987 | Hirotoshi | .............. | F16K 5/0626 |
| | | | | | | 285/388 |
| 4,927,192 | A | * | 5/1990 | Ungchusri | .......... | F16L 19/0231 |
| | | | | | | 285/388 |
| 6,945,569 | B1 | | 9/2005 | Diaz et al. | | |
| 7,963,572 | B2 | | 6/2011 | Bull et al. | | |

(Continued)

FOREIGN PATENT DOCUMENTS

DE  202014101522 U1  7/2015

OTHER PUBLICATIONS

International Search Report dated Mar. 14, 2017 corresponding to International Application No. PCT/US2016/067485.

*Primary Examiner* — David Bochna
(74) *Attorney, Agent, or Firm* — Patterson + Sheridan, L.L.P.

(57) ABSTRACT

An enhanced union connection for connecting tubular members together. The enhanced union connection may include a male end member, a female end member, a wing nut, and nut retaining segments. The union connection is configured to quickly and easily connect and disconnect tubular members together, while providing and maintaining a robust connection and seal (e.g. up to 15,000 psi or more) between the tubular members when connected together.

18 Claims, 1 Drawing Sheet

(56) References Cited

U.S. PATENT DOCUMENTS

| | | |
|---|---|---|
| 7,984,932 B2 | 7/2011 | McGuire |
| 2015/0226355 A1 | 8/2015 | Ungchusri et al. |

* cited by examiner

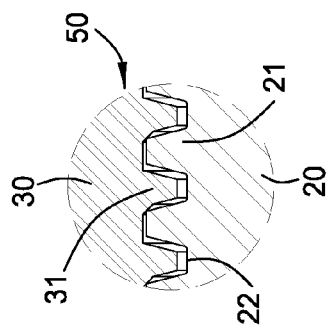
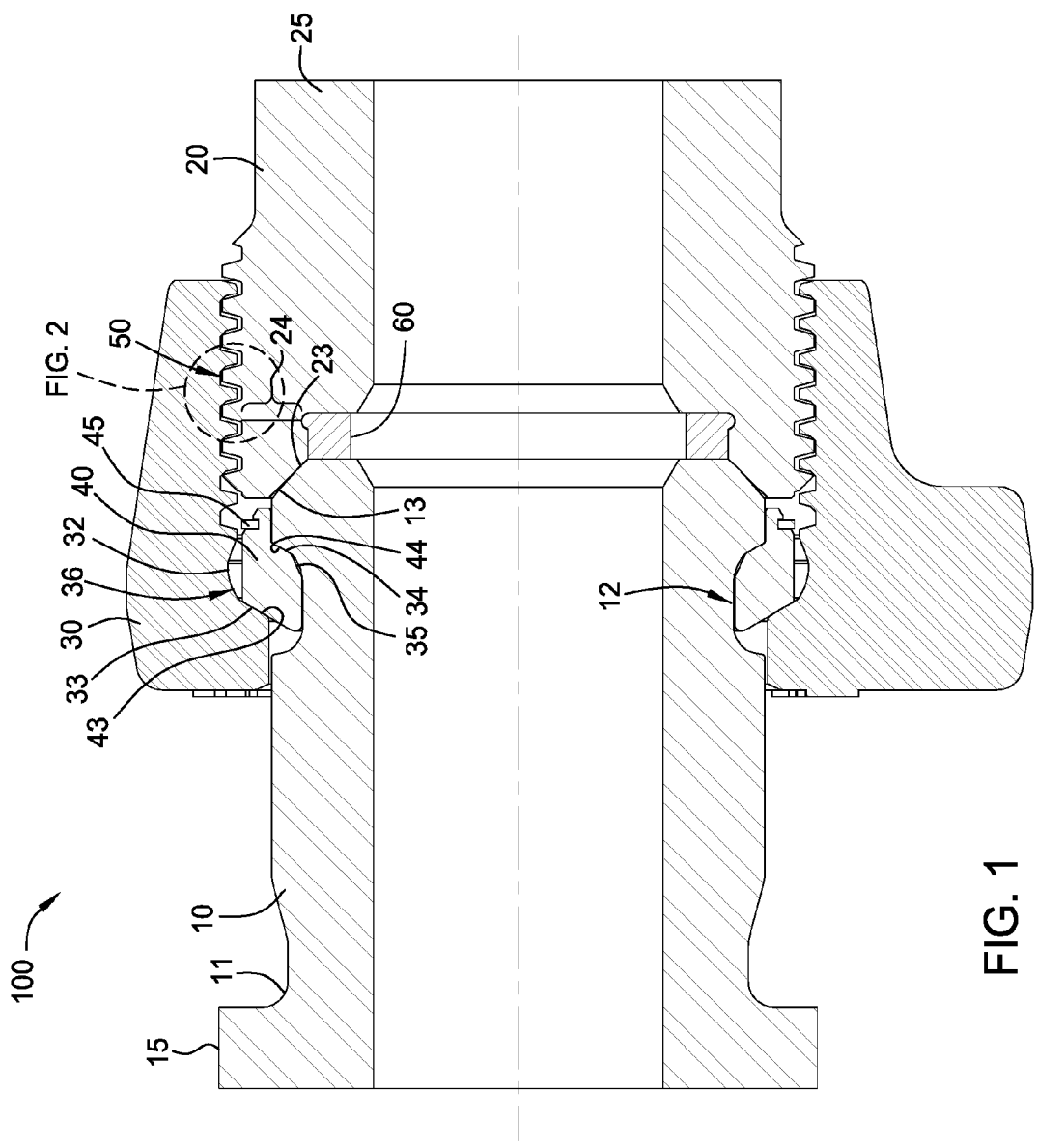

ENHANCED UNION CONNECTION

BACKGROUND

Field

The present disclosure relates to an enhanced union connection for connecting tubular members together.

Description of the Related Art

Oilfield operations, such as hydraulic fracturing, require flowline equipment that can handle a large volume of high pressure fluids that are pumped into a well. The flowline equipment may include numerous lengths, sizes, and shapes of tubular members (such as pipes) and other components that have to be connected together by a connection. The number of connections, the robustness of the connections, and the difficulty of making up and breaking out the connections all contribute to time, cost, and risk of injury to workers of the oilfield operation.

Union connections have been designed to connect and seal the ends of two tubular members together. However, when high pressure fluids are pumped through the tubular members, union connections, and/or other components connected to the tubular members, the flowline equipment begins to expand, vibrate, and/or bind, which causes the union connections to loosen and fail. Therefore, some union connections are bulky and heavy to provide a more robust seal, but which require more time to make up and break out the connection. Other union connections require special tools to make up and break out the connection, which increases cost.

Therefore, there is a need for new and improved enhanced union connections.

SUMMARY

Embodiments of the disclosure include an enhanced union connection for connecting tubular members together.

In one embodiment, a union connection comprises a male end member having a groove formed about an outer circumference of the male end member; at least two nut retaining segments coupled together and at least partially disposed in the groove of the male end member, wherein the groove of the male end member includes a tapered surface that contacts a first tapered surface of the nut retaining segments; a female end member having threads formed about an outer circumference of the female end member; and a wing nut having a groove and threads formed about an inner circumference of the wing nut, wherein the groove of the wing nut includes a tapered surface that contacts a second tapered surface of the nut retaining segments, and wherein the threads of the wing nut thread into engagement with the threads of the female end member.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 illustrates a sectional view of a union connection, according to one embodiment.

FIG. 2 illustrates an enlarged portion of the sectional view of FIG. 1 showing a threaded engagement of the union connection.

For clarity, identical reference numerals have been used, where applicable, to designate identical elements that are common between figures. Additionally, elements of one embodiment may be advantageously adapted for utilization in other embodiments described herein.

DETAILED DESCRIPTION

FIG. 1 illustrates a sectional view of a union connection 100 according to one embodiment. The union connection 100 is configured to quickly and easily connect and disconnect tubular members (such as pipes and other flowline equipment) together. The union connection 100 is also configured to provide and maintain a robust connection and seal (for up to 15,000 psi or more) between the tubular members when connected together.

The union connection 100 includes a male end member 10, a female end member 20, a wing nut 30, and at least two nut retaining segments 40. The male end member 10 may be a tubular member having a flanged end 15 that can be connected to another tubular member, such as a pipe in a flowline of an oilfield operation. The female end member 20 may be a tubular member having an end 25 that can be connected to another tubular member, such as a pipe in a flowline of an oilfield operation.

The wing nut 30 may be positioned over the male end member 10 (or alternatively, the male end member 10 may be inserted into the wing nut 30) prior to connecting to the female end member 20. The male end member 10 may include an undercut or recessed area 11 adjacent to the flanged end 15 to allow the wing nut 30 to move up or down to provide clearance when installing the nut retaining segments 40. The male end member 10 may also include a groove 12 formed about the outer circumference of the male end member 10 within which the nut retaining segments 40 is at least partially disposed as further described below.

The groove 12 of the male end member 10 includes a tapered surface 34 that contacts a corresponding first tapered surface 44 of the nut retaining segments 40 to couple the male end member 10 to the female end member 20. The tapered surfaces 34, 44 may form about a 30 degree angle relative to the vertical axis. The tapered surfaces 34, 44 may also be configured to reduce stress and help self center the male end member 10 relative to the female end member 20 such that the bore of the male end member 10 is co-linear with the bore of the female end member 20.

The groove 12 of the male end member 10 may also include a curved surface 35 adjacent to the tapered surface 34. The curved surface 35 may have a variable blended radius along the length of the curved surface 35 to help disperse stresses in this area. The radius of the curved surface 35 decreases along the length of the curved surface 35 when viewed from the left side to the right side in FIG. 1. Alternatively stated, the radius of the curved surface 35 increases along the length of the curved surface 35 when viewed from the right side to the left side in FIG. 1.

The nut retaining segments 40 may be positioned around the outer circumference of the male end member 10 and at least partially disposed in the groove 12 such that the tapered surfaces 34, 44 are in contact with each other. The nut retaining segments 40 are secured together about the male end member 10 with a retaining ring 45. The nut retaining segments 40 may comprise two, three, four or more pieces (e.g. halves or semi-circular portions) that are coupled together about the male end member by the retaining ring 45.

After the nut retaining segments 40 are coupled to the male end member 10, the wing nut 30 may be moved over the nut retaining segments 40 and rotated into engagement with the female end member 20. The nut retaining segments 40 may be disposed entirely within the wing nut 30 and configured to retain the wing nut 30 onto the male end member 10 as the wing nut 30 is threaded onto the female end member 20. In particular, the wing nut 30 may include threads 31 formed about the inner circumference of the wing nut 30 that couple to threads 21 formed about the outer circumference of the female end member 20. The threads 21, 31 make up a threaded connection 50 between the wing nut 30 and the female end member 20.

FIG. 2 illustrates an enlarged view of a portion of the threaded connection 50. The threaded connection 50 may be a Spiralock® threaded connection that forms a continuous spiral line of point contact along the length of the threads 21, 31, which evenly distributes the load along the threaded connection 50 and is self-locking. Each thread 31 of the wing nut 30 may contact a corresponding thread 21 of the female end member 20 at a single point that creates radially loading (and hoop stress) on the threaded connection 50 to help self center the wing nut 30 relative to the female end member 20 so that they are co-linear, and/or to help self center the female end member 20 relative to the male end member 10 so that they are co-linear. The point contact between the threads 21, 31 also prevents loosening and/or rotation of the threaded connection 50 due to vibration. The threads 21 of the female end member 20 may have a maximized root radius 22 (as shown in FIG. 2) and an increased area thickness 24 to help reduce stresses in the threaded connection 50.

Referring back to FIG. 1, as the wing nut 30 is threaded onto the female end member 40, the wing nut 30 also engages the nut retaining segments 40. As the threaded connection 50 is tightened together, the wing nut 30 couples the nut retaining segments 40 with both the wing nut 30 and the male end member 10. The contact area between the wing nut 30 and the nut retaining segments 40 (at tapered surfaces 33, 43), as well as the contact area between the nut retaining segments 40 and the male end member 10 (at tapered surfaces 34, 44), is maximized to prevent the nut retaining segments 40 from shearing out under load.

The wing nut 30 includes a groove 36 formed about the inner circumference of the wing nut 30 that is positioned around the nut retaining segments 40 when the union connection 100 is made up. The groove 36 of the wing nut 30 includes a tapered surface 33 that contacts a corresponding second tapered surface 43 of the nut retaining segments 40 to couple the male end member 10 to the female end member 20. The tapered surfaces 33, 43 may form about a 30 degree angle relative to the vertical axis. The tapered surfaces 33, 43 may also be configured to reduce stress and help self center the male end member 10 relative to the female end member 20 such that the bore of the male end member 10 is co-linear with the bore of the female end member 20.

The groove 36 of the wing nut 30 may also include a curved surface 32 adjacent to the tapered surface 33. The curved surface 32 may have a variable blended radius along the length of the curved surface 32 to help disperse stresses in this area. The radius of the curved surface 32 increases and then decreases along the length of the curved surface 32 when viewed from the left side to the right side (or when viewed from the right side to the left side) in FIG. 1. Alternatively stated, the radius of the curved surface 35 at the center of the curved surface 35 is greater than the radius of the ends of the curved surface 35.

Before or as the wing nut 30 is threaded onto the female end member 20, the end of the male end member 10 can be brought into contact with the female end member 20. In particular, the end of the male end member 10 opposite the flanged end 15 includes a tapered surface 13 that contacts a corresponding tapered surface 23 of the female end member 20. The tapered surfaces 13, 23 may form a (metal-to-metal) seal when the threaded connection 50 is tightened and the union connection 100 is made up to couple the male end member 10 to the female end member 20. A resilient seal ring 60 may also be positioned between the ends of the male end member 10 and the female end member 20 adjacent to the tapered surfaces 13, 23 to form a seal.

In one embodiment, the union connection 100 may include only the male end member 10, the wing nut 30, and the nut retaining segments 40, which all can be retrofit onto existing threaded female ends of existing tubulars, pipes, and other flowline equipment to form the union connection 100.

One advantage of the embodiments of the union connection 100 described is that the components of the union connection 100 self center and become co-linear as the connection is made up. Another advantage of the embodiments of the union connection 100 described above include a Spiralock® threaded connection that is self-locking, evenly loads the threads, and provides anti-vibration and anti-rotation protection. Another advantage of the embodiments of the union connection 100 described above include a thicker thread area and maximum thread root radius to reduce stresses on the threads. Another advantage of the embodiments of the union connection 100 is the ability to retrofit to existing threaded female ends of existing tubulars, pipes, and other flowline equipment.

It will be appreciated to those skilled in the art that the preceding embodiments are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

We claim:
1. A union connection, comprising:
a male end member having a groove formed about an outer circumference of the male end member;
at least two nut retaining segments coupled together and at least partially disposed in the groove of the male end member, wherein the groove of the male end member includes a tapered surface that contacts a first tapered surface of the nut retaining segments, and wherein the groove of the male end member further includes a curved surface having a variable radius along a length of the curved surface;
a female end member having threads formed about an outer circumference of the female end member; and
a wing nut having a groove and threads formed about an inner circumference of the wing nut, wherein the groove of the wing nut includes a tapered surface that contacts a second tapered surface of the nut retaining segments, and wherein the threads of the wing nut thread into engagement with the threads of the female end member.

2. The connection of claim 1, wherein the variable radius increases along the length of the curved surface.

3. The connection of claim 1, wherein the groove of the wing nut further includes a curved surface having a variable radius along a length of the curved surface.

4. The connection of claim 3, wherein the variable radius of the groove of the wing nut increases and decreases along the length of the curved surface.

5. The connection of claim 1, wherein the threads of the wing nut form a spiral line of point contact with the threads of the female end member.

6. The connection of claim 1, wherein the threads of the wing nut and the threads of the female end member form a self-locking threaded connection when made up together.

7. The connection of claim 1, wherein the threads of the wing nut have single point contact with the threads of the female end member.

8. The connection of claim 1, wherein the male end member includes a flanged end and a recessed area adjacent to the flanged end.

9. The connection of claim 1, wherein the nut retaining segments are coupled together by a retaining ring.

10. The connection of claim 1, wherein the nut retaining segments are entirely disposed within the wing nut.

11. The connection of claim 1, wherein the tapered surface of the groove of the male end member and the first tapered surface of the nut retaining segments are configured to center the male end member relative to the female end member.

12. The connection of claim 1, wherein the tapered surface of the groove of the wing nut and the second tapered surface of the nut retaining segments are configured to center the male end member relative to the female end member.

13. A union connection, comprising:
a male end member having a groove formed about an outer circumference of the male end member;
at least two nut retaining segments coupled together and at least partially disposed in the groove of the male end member, wherein the groove of the male end member includes a tapered surface that contacts a first tapered surface of the nut retaining segments;
a female end member having threads formed about an outer circumference of the female end member; and
a wing nut having a groove and threads formed about an inner circumference of the wing nut, wherein the groove of the wing nut includes a tapered surface that contacts a second tapered surface of the nut retaining segments, wherein the groove of the wing nut further includes a curved surface having a variable radius along a length of the curved surface, and wherein the threads of the wing nut thread into engagement with the threads of the female end member.

14. The connection of claim 13, wherein the variable radius increases and decreases along the length of the curved surface.

15. A union connection, comprising:
a male end member having a groove formed about an outer circumference of the male end member;
at least two nut retaining segments coupled together and at least partially disposed in the groove of the male end member, wherein the groove of the male end member includes a tapered surface that contacts a first tapered surface of the nut retaining segments;
a female end member having threads formed about an outer circumference of the female end member; and
a wing nut having a groove and threads formed about an inner circumference of the wing nut, wherein the groove of the wing nut includes a tapered surface that contacts a second tapered surface of the nut retaining segments, wherein the threads of the wing nut thread into engagement with the threads of the female end member, and wherein the threads of the wing nut have single point contact with the threads of the female end member.

16. A union connection, comprising:
a male end member having a groove formed about an outer circumference of the male end member, wherein at least a portion of the groove has a curved surface with a variable radius along at least a portion of a length of the curved surface;
a female end member having threads formed about an outer circumference of the female end member;
a wing nut having a groove and threads formed about an inner circumference of the wing nut, wherein the threads of the wing nut thread into engagement with the threads of the female end member; and
at least two nut retaining segments coupled together and at least partially in contact with the groove of the male end member and the groove of the wing nut to couple the male end member to the female end member via the wing nut.

17. A union connection, comprising:
a male end member having a groove formed about an outer circumference of the male end member;
a female end member having threads formed about an outer circumference of the female end member;
a wing nut having a groove and threads formed about an inner circumference of the wing nut, wherein at least a portion of the groove of the wing nut has a curved surface with a variable radius along at least a portion of a length of the curved surface, and wherein the threads of the wing nut thread into engagement with the threads of the female end member; and
at least two nut retaining segments coupled together and at least partially in contact with the groove of the male end member and the groove of the wing nut to couple the male end member to the female end member via the wing nut.

18. A union connection, comprising:
a male end member having a groove formed about an outer circumference of the male end member;
a female end member having threads formed about an outer circumference of the female end member;
a wing nut having a groove and threads formed about an inner circumference of the wing nut, wherein the threads of the wing nut thread into engagement with the threads of the female end member and have single point contact with the threads of the female end member; and
at least two nut retaining segments coupled together and at least partially in contact with the groove of the male end member and the groove of the wing nut to couple the male end member to the female end member via the wing nut.

* * * * *